US006756450B2

(12) United States Patent
Marinow

(10) Patent No.: US 6,756,450 B2
(45) Date of Patent: Jun. 29, 2004

(54) CHLORINE-FREE POLYOLEFIN-BASED PLASTISOL OR ORGANOSOL AND METHOD FOR PRODUCING THE SAME

(76) Inventor: Slaweyko Marinow, Uhuweg, 5, D-06120 Halle (DE)

( * ) Notice: Subject to any disclaimer, the term of this patent is extended or adjusted under 35 U.S.C. 154(b) by 0 days.

(21) Appl. No.: 10/343,031

(22) PCT Filed: Jul. 24, 2001

(86) PCT No.: PCT/DE01/02797

§ 371 (c)(1),
(2), (4) Date: May 5, 2003

(87) PCT Pub. No.: WO02/10235

PCT Pub. Date: Feb. 7, 2002

(65) Prior Publication Data

US 2003/0166754 A1 Sep. 4, 2003

(30) Foreign Application Priority Data

Jul. 27, 2000  (DE) .......................................... 100 36 520
Sep. 28, 2000 (DE) .......................................... 100 48 055

(51) Int. Cl.$^7$ ........................ C08F 10/10; C08F 220/06; C08F 220/08; C08F 220/12
(52) U.S. Cl. .................... 525/333.7; 524/114; 524/141; 524/143; 524/296; 524/297; 524/306; 524/581; 524/582; 524/583; 525/240; 525/329.5; 525/329.7; 525/330.3
(58) Field of Search ................................. 524/114, 141, 524/143, 296–297, 306, 582, 585, 581–583; 525/240, 329.5, 329.7, 330.3, 333.7

(56) References Cited

U.S. PATENT DOCUMENTS 4,020,966 A * 5/1977 Wszolek ..................... 215/349
4,093,097 A   6/1978 Wszolek
4,130,213 A * 12/1978 Wszolek ..................... 215/349

FOREIGN PATENT DOCUMENTS

| DE | 37 40 155 C1 |   | 4/1989 |
| DE | 43 31 667 A1 |   | 3/1995 |
| DE | 44 35 643 A1 |   | 4/1996 |
| DE | 44 35 803 A1 |   | 4/1996 |
| DE | 195 37 527 A1 |   | 4/1997 |
| DE | 195 37 527 | * | 4/1997 |
| EP | 0 246 729 B1 |   | 4/1991 |
| EP | 0 769 539 | * | 4/1997 |
| EP | 0 769 539 A1 |   | 4/1997 |
| GB | 2226820 A |   | 7/1990 |

OTHER PUBLICATIONS

Von James J. McSharry, S. Gary Howell and Lee J. Memering, Polyäthylen–Dispersionen, Herstellung und Verarbeitung, Kunststoffe, 59 (1969) 9, pp. 545–549, Europe.

D. Symietz, Romanshorn/Schweiz, Underbody Coatings and Seals for Automobiles, Kunststoffe, 84 (1994) 11, pp. 1611–1613, Carl Hanser Verlag, München.

* cited by examiner

*Primary Examiner*—Peter Szekely
(74) *Attorney, Agent, or Firm*—Webb Ziesenheim Logsdon Orkin & Hanson, P.C.

(57) ABSTRACT

A chlorine-free polyolefin-based plastisol or organosol and method for producing the same, where the plastisol or organosol includes: (a) a finely-dispersed polyolefin in (b) 60 to 800 parts by weight (based on 100 parts by weight polyolefin) of a dispersion medium containing monomers which are capable of polyaddition or are polymerizable and copolymerizable, and/or oligomers and/or prepolymers and optionally, liquid softeners; (c) an initiator system suitable for the desired polyaddition and/or polymerization; and optionally (d) up to 700 parts by weight inert fillers and other additives and auxiliary substances. The chlorine-free plastisol or organosol is storage-resistant at room temperature and gelates at high temperatures. The inventive plastisols or organosols are suitable for many applications and represent an advantageous alternative to the plastisols currently in use, e.g. PVC-based plastisols, since they guarantee a number of different combinations of properties.

23 Claims, No Drawings

CHLORINE-FREE POLYOLEFIN-BASED PLASTISOL OR ORGANOSOL AND METHOD FOR PRODUCING THE SAME

BACKGROUND OF THE INVENTION

1. Field of the Invention

The invention relates to chlorine-free polyolefin-based plastisol or organosol and method for producing the same 2. Description of the Prior Art The terms plastisols or organosols generally refer to dispersions of fine-particle plastic powders in softeners that harden or gelate when heated to higher temperatures. Organosols or plastisols currently in use are typically composed of fine-particle polyvinyl chloride (PVC), polyvinyl chloride-vinyl acetate copolymers (PVC/PVAc), polymethyl methacrylate (PMMA), and polyalkyl methacrylate (PAMA) such as polymethyl methacrylate copolymers, that is dispersed in a liquid softener and forms a paste.

These pastes can be mixed with multifunctional monomers, oligomers and prepolymers capable of polymerization or copolymerization and the respective initiator systems to influence processing and application characteristics as desired.

The plastisols or organosols thus obtained can be used for various purposes, especially as a sealing and soundproofing compound, car undersealant, corrosion-protective coatings for metals, coil coatings, for impregnating and coating of textile and paper substrates, as a final finish of PVC floor coatings, cable insulating materials, etc.

PMMA- and PAMA-based plastisols or organosols however, despite their environmental compatibility, could not assert themselves against PVC-containing plastisols or organosols in all these applications for all sorts of reasons. For example, PMMA- or PAMA-based plastisols or organosols form a stable coating after gelating at approx. 150° C. When the coating has cooled down, however, softeners contained in the material start bleeding. This phenomenon is particularly pronounced for phthalic acid ester softeners that are most commonly used.

Improving the compatibility of the polymers or copolymers with phthalic ester softeners can produce a stable coating. This is achieved by increasing the portion of acrylic or methacrylic esters of higher alcohols in the copolymers using methyl methacrylate.

But here the problem occurs that spray coating is no longer an option because the viscosity of the plastisol produced in this way increases in a short time so that a solidified product is formed.

The use of polymer particles with greater diameters was proposed to improve storage life. But this measure has natural limits because polymer particles with a diameter of more than 10 microns cause problems when the coating is applied (spray nozzle clogging, sprinkling width limitation). In addition to their limited storage life, it was mainly poor cost efficiency and industrial health issues of the production and processing of PMMA- or PAMA-based plastisols or organosols that placed them at a disadvantage as compared to PVC-containing plastisols or organosols.

PVC/containing plastisols or organosols are currently the most commonly used materials for the applications listed above.

However, a number of severe problems occur when producing and using PVC-containing plastisols or organosols. Monomer residues in the PVC can endanger people during processing. It is a disadvantage when using PVC-containing plastisols or organosols that PVC is sensitive to both heat and light and that it tends to split off hydrogen chloride. Splitting off hydrogen chloride is a serious application problem because any hydrogen chloride that may be released at the prevailing gelating temperatures is corrosive and attacks metal substrates.

Heat stabilizers are used to remove this disadvantage but these are often toxic and a source of danger when applying the coat or using the product.

A particularly severe problem is waste disposal and the disposal of used coatings of PVC-containing plastisols or organosols. Hydrochloric acid gas (HCl) and polychlorinated dibenzofuranes and dioxins are formed during thermal disposal, which causes considerable environmental problems. Accordingly, waste and used coatings made of PVC-containing plastisols or organosols can only be disposed of in landfills for hazardous waste and at considerable cost. This also causes a considerably worse cost efficiency of PVC plastisols or organosols.

Efforts are being made to reduce the quantity of hydrochloric acid gas released when incinerating PVC. It is known that compounds such as oxides, carbonates, hydroxides, or organic acid salts of alkaline or alkaline earth metals that bind or neutralize any hydrochloric acid gas that may be released can be embedded into the plastisols or organosols. But then the problem arises that the plastisols or organosols show an increase in viscosity that renders them unsuitable for spray coating and that the specific weight of the coatings is also considerably increased.

Polyolefins, particularly polyethylene, are widely used as a chlorine-free coating material. Polyethylene coatings are characterized by excellent resistance to chemicals and moisture, high elasticity and corrosion resistance. They are applied as a molten film by rolling or extruding, or as powders by flame spraying, electrostatic spraying, or fluidized bed coating. Attempts were made to process these compounds, especially polyethylene, as a dispersion as this considerably extends the scope of application of polyethylene coatings. Dispersion coatings are not limited to all-over application, are excellently suited for surfaces that have an irregular shape and for special application processes (such as egoutteur blade coating).

Several proposals have been made to produce aqueous polyethylene dispersions. EP 0246729 describes the production of an aqueous dispersion from a hydrophobic polymer, i.e. from a polyolefin or copolymers derived from the same and a water soluble thermoplastic olefin copolymer that contains carboxylate groups (0.1 to 5 mg COO per g). Solid polyolefin dispersions are obtained in conjunction with anionic or non-ionic surface-active agents, organic solvents and water; these can be converted into flowable dispersions by adding more water. The publication mentions the suitability of these products as coating materials but does not give any specifications as to thicknesses of layer, drying conditions, and coating quality.

It is also known that aqueous PE dispersions can be produced by suspending fine-particle PE powder in water using surface-active agents and mixing in viscosity-lowering, thixotropy-imparting and coagulating additives [Kunststoffe 59 (1969) 9 pp. 545/549]. As fine-particle PE powders are very expensive, such dispersions have a poor cost efficiency [Kunststoffe 84 (1994) 11 pp. 1611/1613].

Aqueous dispersions of polyethylene with medium viscosity that can be used for coating paper are obtained using a suspending agent from a reaction product of fatty alcohols with ethylene oxide in combination with water-soluble, non-ionogenic polymers that have a thickening effect (DE-PS 3740155).

A disadvantage of such dispersions is their relatively low solids content (typically 10 to 40%) which makes them suitable for thin varnish-like coatings (50 to 500 microns) only. When used as a sealing compound and for thicker coatings, the high content of volatile ingredients may result in the formation of bubbles, tension cracks, etc. It is further known that the adhesive capacity of the polyethylene films mainly depends on the hot melt temperature. Coatings with excellent adhesion can only be obtained at temperatures in the range from 200° C. to 230° C., which means that the process is characterized by a high demand for energy.

The volume contraction as a consequence of crystallization further results in deformation and wear of PE coatings, especially when coating film-like substrates, textiles, or paper, which render the composite unusable.

As PE is non-polar, there can be no printing or applying varnish onto such coatings.

DE-OS 4331667 describes the production of a polyolefin-based coating material by functionalizing polyolefin powder while putting through a plasma gas such as argon, oxygen, nitrogen, vinyl acetate, acryl nitrile using high frequency or microwave stimulation. Dispersion of polyolefin powders treated that way in non-boiling softeners is said to result in plastisols that are suitable as coating materials.

Such plastisols however do not yield suitable coatings as softener solvation is insufficient so that intense softener bleeding occurs after a short time.

The cost efficiency of these plastisols is very poor due to the high price of the respective fine-particle PO powders.

DE 4435643 describes a mixture of a plastisol nature consisting of finely dispersed powder of polyethylene and/or selected ethylene copolymers and a composition of low-molecular components termed softener wherein the softener compositions used of saturated and/or olefinically unsaturated hydrocarbon compounds with C numbers in the fatty range (fatty acids, fatty alcohols and/or derivatives of the same) dissolve the finely dispersed polymer at gelating temperature and yield a plastigel after cooling.

Plastisols obtained in this way show intense softener bleeding after only a short time so that no usable coatings can be produced. In addition, these coatings have insufficient properties.

To eliminate these disadvantages, parallel application DE 4435803 proposes softener compositions that exclusively or partially consist of reactive components that react at gelating temperatures with enlargement of the molecule when adding the respective initiator systems.

Both applications require that the polymer dissolves homogeneously in the softener composition at the respective gelating temperatures and time to yield a viable plastisol. This requires very fine dispersity of the polymer and a grain size well under 30 microns. When the dispersity is less fine (average grain size >30 $\mu$m), it is impossible to prepare a sufficiently homogeneous dissolution of the polymer in the softener, especially with reactive softeners, which considerably deteriorates the properties of the gelated coating.

Currently powders made of various polyethylene and ethylene copolymer types with an average grain size above 30 microns are commercially available but at a several times higher price than the corresponding granulate. Plastisols produced with such powder will have a low level of beneficial properties and be relatively expensive, which indicates unfavorable cost efficiency. The proposed comminution of the polymer in the presence of at least one portion of softener, e.g. in a refrigerated extruder, typically results in crude dispersion of the polymer and therefore in an even poorer product. If the softener reactions are delayed to dissolve cruder PO particles (>30 $\mu$m), gelating times are extended accordingly. This results in reduced productivity and a simultaneous increase in energy demand of the gelating process, which further deteriorates cost efficiency.

Another non-aqueous polyolefin dispersion and a method for producing the same is presented DE 19537527 according to which a polyolefin is transformed into a molten state and dispersed in a fatty acid-modified polyester resin using a non-volatile liquid softener. The finely dispersed composition obtained in this way can be hardened by adding a foreign resin in the form of an epoxide at temperatures in the range from 140° C. to 200° C. and be used as a coating material. The properties of the dispersion and the resulting coatings can be further varied by adding hardening accelerators, reaction diluents and, if required, small quantities of solvents as well as the common adjuvants and additives.

When reaction accelerators and reactive diluents are added, an addition reaction is initiated at room temperature that reduces the storage stability of the dispersion and represents a major disadvantage as compared to PVC plastisols.

SUMMARY OF THE INVENTION

It is the object of the invention to develop novel polyolefin-based plastisols or organosols and a method for their production. These plastisols or organosols should have or optionally exceed the excellent product properties of PVC-containing plastisols or organosols but be chlorine-free, which means that they neither split off chlorine nor hydrogen chloride and are therefore free from the disadvantages encountered in the production, processing and disposal of PVC-containing plastisols or organosols as mentioned above.

In general, polyolefin types that are commercially available in granular form as granulates or crumbs are to be used for producing these plastisols or organosols. The production method to be developed is to ensure efficient fine-particle dispersion of the lumpy polyolefin in a dispersion medium so that the polyolefin is dissolved homogeneously in the dispersion medium in a very short time during the gelating of the plastisol in order to produce coatings with excellent product properties at relatively high efficiency and with a low energy demand of the gelating process.

DETAILED DESCRIPTION OF THE INVENTION

The novel polyolefin plastisols or organosols should not contain any or only contain a small quantity of volatile components, have a relatively low viscosity and long storage stability and be applicable by spraying, painting, immersing, filling, or rolling to yield coatings at layer thicknesses of up to approx. 2 mm that gelate at temperatures below 200° C. and with no significant change of application thickness to form an adherent chemical-resistant coating layer with a relatively low specific weight. The gelated coatings should be suitable for printing and applying varnish onto and show no deformation tendencies.

According to the invention, this object is achieved by a polyolefin-based chlorine-free plastisol or organosol that is stable for storage at room temperature and gelates when heated to higher temperatures, that may contain inert fillers and other common additives and adjuvants consisting of a) a finely dispersed polyolefin in b) a dispersion medium in quantities of 60 to 800 parts by weight, in relation to 100 parts by weight polyolefin a), made up of monomers which are capable of polyaddition or which are polymerizable and copolymerizable and/or oligomers and/or prepolymers and, optionally, liquid softeners composed in such a way in its soluble and mixable portions that the difference between its solution parameter and the solution parameter of the polyolefin a) is below 2.5 $(J/cm^3)^{0.5}$; and c) an initiator system which is suitable for the desired polyaddition and/or polymerization and copolymerization in quantities known per Se;

d) optionally, up to 700 parts by weight of inert fillers and other common additives and adjuvants in relation to 100 parts by weight of polyolefin a) and is produced in 2 or 3 different temperature levels in 2 or 3 by 1. homogeneously mixing a lumpy (granulate, crumbs, cuttings) polyolefin a) in a mixing apparatus (kneader, dissolver, extruder) at a temperature 10° C. or more above its melting temperature in quantities of at least 20 to 60 parts by weight, preferably 25 to 35 part by weight, of a dispersion medium b) or some selected components of a dispersion medium b), in relation to 100 parts by weight polyolefin a), 2. subsequently cooling the batch under continued intense intermixing down to a temperature of 5 to 20° C. below the melting temperature of polyolefin a)—and optionally adding and homogeneously intermixing 5 to 70 parts by weight of dispersion medium b) or some selected components of a dispersion medium b), in relation to 100 parts by weight polyolefin a)—, to produce a fine-particle dispersion of polyolefin a) in the dispersion medium b) or some selected components of a dispersion medium b), and 3. finally intermixing the batch with the dispersion medium b) or the remaining components of the dispersion medium b) at a temperature below 60° C. up to a total quantity of 60 to 600 parts by weight dispersion medium b), in relation to 100 parts by weight polyolefin a) and with a suitable initiator system c) in quantities known per se as well as with up to 700 parts by weight inert solids and common additives and adjuvants d) and processing it into a paste-like melt with the desired rheological behavior.

To ensure such behavior, the dispersion medium b) is formulated so that the difference between its solution parameter and that of the polyolefin a) is below 2.5 $(J/cm^3)^{0.5}$.

The nature of polyolefin a) and dispersion medium b) allows further variation of the properties of the plastisols or organosols according to the invention and the resulting coatings in that special additives that directly influence vapor permeability, hydrophilia and hydrophobia are added to the plastisols or organosols in addition to the common additives and adjuvants.

The main component of the plastisols or organosols of the invention is a polyolefin a), polyethylene, polypropylene and/or copolymers of ethylene and propylene with one or several olefinically unsaturated monomers that can be copolymerized with these olefins being preferred.

All known polyethylene and polypropylene types may be used if they can be processed in the melt. Ethylene or propylene copolymers with one or several unsaturated copolymerizable monomers are suitable. Suitable comonomers for olefin copolymers are unsaturated compounds that can be copolymerized with ethylene or propylene such as olefins, acrylic acid and methacrylic acid and derivatives thereof, olefinically unsaturated dicarboxylic acids and their derivatives, vinyl ester and vinyl ether.

Examples are copolymers from ethylene or propylene and higher α-olefins from $C_3$ to $C_8$ or isomers thereof such as lower- and medium-density linear polyethylene (PE-LLD or PE-MD, respectively), vinyl acetate, vinyl alcohol, maleic acid anhydride, methyl or ethyl acrylate. The comonomer portion is between 1 and 50 mole percent, preferably between 2 and 15 mole percent and is configured to bring the melting point of the olefin copolymers into a range from 60 to 160° C., preferably into a range from 80 to 140° C.

Polyolefins that were later modified using polar and/or reactive groups such as acids and esters are advantageous, too.

One way to obtain polyolefins that are modified like that is to graft the polyolefin in the melt with radically polymerizable monomers in the presence of thermally degrading initiators. The following can be used as graft monomers: (meth)acrylic acid, (meth)acrylic ester, maleic acid anhydride, itaconic acid anhydride, vinyl acetate, triethoxyvinyl silane et al.

Single polyolefins and mixtures of various polyolefins can be used.

Mixtures of the above polyolefins with compatible or partially compatible rubbers comprising unsaturated chains and being composed in full or partially of diolefins (R rubbers) are well suitable in quantities up to 80 percent by weight. Examples are natural rubber (NR), isoprene rubber (IR), butadiene rubber (BR), styrol-butadiene rubber (SBR), isoprene-styrol rubber (SIR), polynorborene rubber (PNR), butyl rubber (HR) as well as trans-polyoctenamer rubber (TOR) and the like. In addition, the rubber components may be composed of saturated chains of the polymethylene type (M rubber) such as ethylene-propylene-(diene) rubber (EPM or EPDM), Ethylen-acrylic ester rubber (AECM), ethylene vinyl acetate rubber (EAM) as well as acrylate rubber (ACM, ABR, ANM).

TPE block copolymers may also be used. These include blends of polyolefins with crosslinked elastomer phase, ionomers, amorphous teleblock copolymers (triblock copolymers) with a long-chain soft segment center block and terminal hard segment block, the hard domain acting as cross-linking site, as well as blends of thermoplastics and segment copolymers of long-chain soft and hard segment blocks with a crystallization tendency. Particularly suitable substances are styrol/ethylene-butylene/styrol triblock copolymers (SEBS), styrol/ethylene-propylene/styrol triblock copolymere (SEPS) and many others.

The other crucial component of the plastisols or organosols of the invention is a dispersion medium b) that consists of liquid monomers or monomers melting at low temperatures that are capable of polyaddition and/or polymerizable or copolymerizable and/or oligomers and/or prepolymers and, optionally, of liquid softeners in soluble or mixable portions.

It is composed according to the invention so that it does not dissolve the polyolefin a) at room temperature and causes little or no swelling but does dissolve the polyolefin at temperatures exceeding its melting temperature and produces highly concentrated solutions or colloidal solutions of the polyolefin a).

A preferred dispersion medium b) is used that consists of epoxide compounds (monomers and/or oligomers and/or prepolymers) and, optionally, of liquid softeners (taking into account swelling capacity and solubility and eventual chemical coupling); an initiator system based on latent polyaddition initiators, catalytic Lewis acid polymerization initiators or latent carboxylic acid salts of tertiary amines and/or common cationic photoinitiators is used for gelating the plastisol.

The following are examples of suitable substances for composing a dispersion medium b) according to the invention:

aliphatic glyceride ethers or esters such as mono- or diglycidyl ethers or esters of branched or unbranched alkanoic acids, particularly with carbon atoms $\geq C_6$, mono- or diglyceridyl ethers of poly(alkylenoxide) mono- or -diglyceride ethers or epoxide-(cresol)-novolak types or cycloaliphatic mono-or diglyceride ester types (such as hexahydrophthalic acid diglyceride ester) or cycloaliphatic mono- or diglyceride ester types with directly bound epoxide groups (e.g. 3,4-epoxycyclohexylmethyl-3,4-epoxycyclohexyl carboxylate vinylcyclohexene dioxide) or bisphenol-glyceride ether types, diglyceridyl ether as those based on bisphenol-A- or -F- or -A/F.

The following are suitable as the optionally addable softener component of dispersion medium b): Phthalate softeners, especially diisooctyl phthalate, diisononyl phthalate, diisodecyl phthalate, adipic, azelaic and sebacic acid esters (diisononyl adipate, diisodecyl adipate) and/or phosphate softeners and/or alkylsulfonic acid phenyl esters and/or epoxidated fatty acid esters (butyl, octyl epoxistearate) and/or epoxidated unsaturated fatty acid esters (epoxidated flaxseed or soybean oil) and/or oligomer or polymer softeners (polyisobutylene, liquid isoprene, butadiene, ethylene-propylene-diene or butyl rubber).

The plastisol or organosol that contains a dispersion medium b) composed of epoxide compounds is gelated using an appropriately configured initiator system c) for polyaddition or ionic polymerization.

Initiator systems c) of latent (blocked aliphatic (poly) amines, (poly)amides and polyaminoamides (dimerized fatty acids and polyalkylene polyamine) or low-molecular compounds such as N-cyanoguanidine (dicyandiamide) and dimethyl urea derivatives (e.g. N,N-(4-methyl-m-phenylene) bis (N'-dimethyl urea) are used for polyaddition.

Suitable cationic polymerization initiators are Lewis acids such as boron trifluoride amine complexes consisting of boron trifluoride complexes of monoethyl amines or other tertiary amines and latent carboxylic salts of tertiary amines such as triso(dimethylaminomethyl)-phenolotris-2-ethylhexoate).

A useful dispersion medium b) may also consist of radically polymerizable and copolymerizable allyl and/or vinyl and/or (meth)acrylate compounds (monomers and/or oligomers and/or prepolymers) and/or unsaturated polyester, vinyl ester polyester acrylate resins and optional liquid softeners; an initiator system c) made of free-radical initiators such as common organic peroxides and/or suitable photoinitiators is used for gelating the plastisol or organosol in a polymerization or copolymerization process.

Suitable compounds include the following:

Diallyl esters of phthalic acids such as diallyl phthalate, diallyl terephtalate and the like; diallyl ester of ethylenically unsaturated carboxylic acids such as diallyl maleate, diallyl fumarate, diallyl itaconate and the like; diallyl esters of saturated dibasic acids such as diallyl adipate, diallyl azelate, diallyl sebazinate and the like, diallyl ether; triallyl cyanurate; triallyl trimellitate as well as diallyl phthalate resins and/or vinyl esters, especially mono- or difunctional vinyl esters of branched or unbranched alkanoic acids, especially with $\geq C_6$ and/or vinyl ethers, especially mono- or difunctional vinyl ethers of branched or unbranched alcohols with $\geq C_6$ glycols or phenols such as ethyleneglycol divinyl ether, n-butanediol divinyl ether, decane divinyl ethers, octadecane divinyl ethers and the like and/or dimethacrylic esters or diacrylic esters of polyfunctional alcohols such as ethyleneglycol dimethacrylate, diethyleneglycol di(meth) acrylate, triethyleneglycol di(meth)acrylate, polyethyleneglycol di(meth)acrylate and the like, tri(meth)acrylic esters of polyfunctional alcohols such as trimethylolpropanetriol (meth)acrylate, trimethylolethanetriol (meth)acrylate and the like; poly(alkylenoxide)mono- or -di(meth)acrylate; poly(alkandiol) mono- or di(meth)acrylate; reactive (meth) acryl resins; bis-methacryloyloxyethylene phthalate; 1,3,5 triacryloylhexahydrotriazine and similar compounds and/or unsaturated polyester resins, i.e. polycondensates of unsaturated or saturated polycarboxylic acids or anhydrides with aliphatic or aromatic or aromatic higher alcohols (glycols, propylene glycols, butanediol) and/or vinyl ester resins (phenacryl resins) of acrylic acid esters with bisophenol-A-glyceride ether or epoxidated novolaks and/or polyester acrylate resins.

The dispersion medium b) according to the invention may also contain compatible liquid softeners. Suitable are the common phthalate softeners, especially diisooctyl phthalate, diiononyl phthalate, diisodecyl phthalate, adipic, azelaic and sebazinic ester, phosphate softeners, alkyl-sulfonic-phenyl esters, epoxidated fatty acid esters (butyl-, octylepoxistearate), epoxidated flaxseed or soybean oil, polyester softeners polyesters from alkanediols with 2–6 C atoms and dicarboxylic acids), oligomeric or polymeric softeners (polyisobutylene, liquid isoprene, butadiene, ethylene-propylene-diene or butyl rubber), and mineral oil softeners (aromatic, naphthenic, relative naphthenic and paraffinic types).

An initiator system c) is used for gelating a plastisol or orgnasol containing a dispersion medium b) composed of radically polymerizable and copolymerizable monomers and/or prepolymers and optional liquid softeners that consists of radical initiators such as common organic peroxides and/or suitable photoinitiators. Examples are di-tert.-butyl peroxide, tert.-butylhydroperoxide, dicumyl peroxide, dilauryl peroxide, benzoyl peroxide, tert.-butyl perbenzoate and many others.

A dispersion medium b) according to the invention can also be a compatible combination of epoxide compounds (monomers and/or oligomers and/or prepolymers) and allyl and/or vinyl and/or (meth)acrylate compounds and/or unsaturated polyester, vinyl ester, polyester acrylate resins and optional liquid softeners; an initiator system c) made of saturated and unsaturated acid anhydrides and free-radical initiators such as common organic peroxides and/or suitable photoinitiators is used for gelating the plastisol or organosol in a combined polyaddition, polymerization and copolymerization process. Photoinitiators can be used as initiator system c) either alone or in combination with the radical or ionic initiators mentioned above. The commercially available radical and ionic photoinitiators are suitable.

According to the invention, finely dispersed chlorine-free polyolefin-based plastisols or organosols are produced by 1. homogeneously mixing a lumpy polyolefin b) in a mixing apparatus (kneader, dissolver, extruder) at a temperature 10° C. or more above its melting temperature in quantities of at least 20 to 60 parts by weight of a dispersion medium b) or some selected components of a dispersion medium b), in relation to 100 parts by weight polyolefin a),
2. subsequently cooling the batch under continued intense intermixing down to a temperature of 5 to 20° C. below the melting temperature of polyolefin a)—and optionally adding and homogeneously intermixing 5 to 70 parts by weight of dispersion medium b) or some selected components of a dispersion medium b), in relation to 100 parts by weight polyolefin a)—, to produce a fine-particle dispersion of polyolefin a) in the dispersion medium b) or some selected components of a dispersion medium b), and 3. finally intermixing the batch with the remaining dispersion medium b) at a temperature below 60° C. up to a total quantity of 60 to 800 parts by weight dispersion medium b), in relation to 100 parts by weight polyolefin a) and with a suitable initiator system c) in quantities known per se as well as with up to 700 parts by weight inert solids and common additives and adjuvants d), and processing it into a paste-like melt with the desired rheological behavior.

It is useful to intermix a usually lumpy form (granulate, cuttings, crumbs) of polyolefin a) in a mixing apparatus (kneader, dissolver, extruder) at a temperature of 10° C. or more above the melting temperature with at least 20 to 60 parts by weight of dispersion medium b) or some selected components of dispersion medium b) so that a highly concentrated solution or colloidal solution of polyolefin a) is produced. When cooling these solutions under continued intermixing in the second process step, a fine-particle dispersion of polyolefin a) in the dispersion medium b) or the selected component of dispersion medium b) is formed as soon as the temperature drops below the melting temperature of polyolefin a). The dispersion thus obtained takes forms from solid agglomerate crumbs to a kneadable melt with a primary grain size below 10 microns.

The fine-particle composition thus obtained is intermixed in the third process step with the remaining dispersion medium b) or the remaining components of dispersion medium b) and the initiator system c) as well as any additives, adjuvants, and fillers d) to produce the plastisols or organosols according to the invention. The selected components can be added one by one or, if they are intermixable, in form of a master batch; they are intermingled homogeneously at a maximum temperature of 70° C.

It is preferred to mix and homogenize the polyolefin a) in the first process step with 25 to 35 parts by weight of the dispersion medium b) or some selected components of the dispersion medium b), in relation to 100 parts by weight polyolefin a).

If required, an additional 5 to 70 parts by weight of the dispersion medium b) or a component thereof, in relation to 100 parts by weight polyolefin a), can be worked into the batch in the second process step at a temperature of 5° C. to 20° C. below the melting temperature of polyolefin a).

The plastisols or organosols according to the invention have a rather low viscosity and long storage life. They can be applied onto various substrates by spraying, painting, immersing, blade coating, calendering or casting, depending on the viscosity set, to form coatings with layer thicknesses from a few microns to 2 mm.

Then the applied plastisol or organosol is gelated. Temperatures ranging from 100° C. to 200° C. are applied depending on the composition of the plastisol or organosol and the respective gelating regime. The applied coat can be gelated at a constant temperature over time or at temperatures increasing over time in steps or steplessly. The required gelating times are between 1 minute and several hours. The coat can be heated using hot air, infrared radiation, high frequency, etc.

The plastisols or organosols according to the invention can also be gelated selectively, layer by layer, into molded pieces using IR laser beams. The plastisol applied is heated prior to UV exposure for homogeneous breaking up of the polyolefin particles when the plastisols of the invention are gelated using photoinitiators. The preheated plastisol can also be gelated selectively, layer by layer, into molded pieces using subsequent IR and UV laser beam irradiation or UV laser beam irradiation only.

The properties of the coatings made using plastisols or organosols according to the invention can very widely depending on their overall composition. It is possible to produce thermoplastic, elastomeric, and hardened or rigid films and coatings.

The plastisols or organosols according to the invention have excellent physical properties, working properties, safety and efficiency parameters that match those of PVC plastisols. They are much more advantageous than PVC plastisols when it comes to the disposal of waste and used coatings. Their thermal disposal does not cause environmental problems, there is no extra cost involved for hazardous waste landfills and no degradation of cost efficiency.

The plastisols and organosols of the invention are suitable for many applications by offering manifold combinations of properties and thus are an excellent alternative to the plastisols currently in use, especially PVC-based plastisols.

The plastisols or organosols according to the invention are particularly suitable as corrosion and wear protection for metals, for coil coating, as sealing and sound-absorbing compounds, as car undersealants, as a weld sealant for leveling welded joints, and as metal adhesive.

Furthermore, they are suitable for impregnating and coating textiles, paper, and similar substrates such as canvases, synthetic leather, floor coverings, carpet backs, packaging materials, wallpapers, and many others.

Highly elastic profiles such as sealing strips and tapes and various interlaminar bond materials, can be produced in combination with various polymers using the extrusion process.

Selective layer-by-layer gelating of the plastisols or organosols of the invention into various molded pieces makes these materials suitable for the rapid prototyping technology. It is also suited for efficient enclosure of electronic components.

The examples below are to explain the invention in greater detail. (Wherein: PO=polyolefin, UP=unsaturated polyesters)

EXAMPLE 1

A mixture of 90 percent by weight of an ethylene-acrylic acid copolymer and 10 percent by weight of an EPM rubber modified with maleic anhydride was used as polyolefin polymer a).

100 parts by weight of the mixture and 43 parts by weight of an epoxide (EP) resin (bisphenol-A resin with an epoxide equivalent weight of 875 to 1000 g/eq and a molar weight >700 g/mol) were homogeneously intermixed in a kneader at a temperature of 130 to 140° C. Subsequently, 21 parts by weight of an epoxide diluent (1:1 mixture of hexanediol diglyceride ether and a monoglyceride ether made up of $C_{12}$ to $C_{14}$ alcohols with an epoxide equivalent weight from 200 to 220 g/eq) are added and intermixed until a homogeneous glassy melt is obtained.

Then the batch is cooled down to 90° C. while the kneading continues. A phase separation occurs when the batch is cooled below the melting temperature of the polyolefin, and polyolefin precipitates with an extremely small grain size. It is dispersed in the resin diluent solution. In addition, 21 parts by weight of epoxide-diluent are added and worked in at 90° C. while the cooling process continues. The product is a soft paste-like dispersion of the following composition:

100 parts by weight polyolefin polymer a)
43 parts by weight of bisphenol-A resin with an epoxide equivalent weight from 875 to 1000 g/eq and a molar weight >700 g/mol
43 parts by weight of a mixture of hexanediol diglyceride ether and a monoglyceride ether made up of $C_{12}$ to $C_{14}$ alcohols with an epoxide equivalent weight from 200 to 220 g/eq (ca. 1:1 mixture)

The disperse polyolefin (PO) phase has an average grain size of approx. 5 microns.

The dispersion produced in this way has turned into a plastisol.

A plastisol of the following composition was processed further.

186 parts by weight of polyolefin (PO) dispersion
108 parts by weight of a 1:1 mixture of hexanediol diglyceride ether and a monoglyceride ether made up of $C_{12}$ to $C_{14}$ alcohols with an epoxide equivalent weight from 200 to 220 g/eq
74 parts by weight diglyceridyl ether of hexanediol with an epoxide equivalent weight of 145 g/eq
29 parts by weight of diisononyl phthalate
80 parts by weight of chalk
6 parts by weight of N,N-(4-methyl-m-phenylene)bis(N',N'-dimethyl urea)
17 parts by weight of cyanoguanidine (dicyandiamide)
0.08 parts by weight of black The components are homogeneously intermixed in a mixer at 60° C. until the batch reaches a glassy, paste-like state. The melt temperature should not exceed 70° C. The PO plastisol produced in this way has a strongly thixotropic rheological behavior and a viscosity of 4 . . . 5 Pa*s at 131 l/s.

The PO organosol was applied to various substrates (steel plate, plate coated by cataphoretic dipping, galvanized plate, aluminum plate, glass) with a thickness of layer ranging from approx. 1.5 to 2 mm. Gelating at 150° C. for 30 minutes resulted in smooth (elastomeric) coats with good adhesive capacity. Blade-coated film samples were gelated from the PO plastisol at 150° C. for 30 minutes. A tension test of the gelated film samples showed a tensile strength of 4.0 MPa and an elongation due to tearing of 750%.

EXAMPLE 2

A mixture of 100 parts by weight of an LD-PE and 67 parts by weight of a TPE block polymer was used as polyolefin polymer a).

167 parts by weight of the mixture and 43 parts by weight of a solid unsaturated polyester (UP) resin were homogeneously intermixed in a kneader at a temperature of 125 to 130° C. Then 31 parts by weight of a solution consisting of a liquid unsaturated polyester (UP) resin and a bifunctional methylacrylate (polyethyleneglycol-400-dimethacrylate) were added by dripping at a ratio of 0.9:1, and intermixed with the batch until a homogeneous glassy melt has formed. Then the batch is cooled down to 90° C. while the kneading continues. A phase separation occurs when the batch is cooled below the melting temperature of the polyolefin polymer, and the polyolefin polymer precipitates with an extremely small grain size and is dispersed. 31 additional parts by weight of the solution of liquid UP resin and polyethyleneglycol-400-dimethacrylate are added at 90° C. and worked in homogeneously. Mixing and cooling of the batch continues until a temperature of 60° C. is reached. The product is a soft paste-like dispersion of the following composition:

100 parts by weight of polyolefin polymer a)
67 parts by weight of TPE block polymer
43 parts by weight of solid UP resin based on isophthalic acid and neopentyl glycol with a softening point of 80 to 90° C.
30 parts by weight of liquid monomer-free UP resin with an acid number <25, and $p_{25° C.}$=1.04 g/cm³
<u>33</u> parts by weight of polyethyleneglycol-400-dimethacrylate
273

The disperse PO phase has an average grain size of approx. 5 mm. The dispersion produced in this way is further processed into a PO plastisol with the following composition:

273 parts by weight of PO dispersion
39 parts by weight of liquid UP resin
44 parts by weight of polyethyleneglycol-400-dimethacrylate
158 parts by weight of vinyl ester of neodecanoic acid
35 parts by weight of phthalic diethylhexyl ester
10 parts by weight of tert. butyl perbenzoate
28 parts by weight of chalk
56 parts by weight of titanium dioxide
14 parts by weight of fatty acid dioldiacrylate The components are homogeneously intermixed in a mixer until the batch reaches a glassy, paste-like state. The melt temperature should not exceed 70° C.

The plastisol thus obtained shows pseudoplastic rheological behavior and has a viscosity of 5.5 Pa*s at 131 1/s.

Films approx. 150 mm in thickness were gelated from the PO plastinol without pressure over about 5 minutes at 190° C.

A tension test of the gelated films showed a tensile strength of 7.5 MPa and an elongation due to tearing of 100%.

The PO plastinol was applied onto paper and textile fabric at a layer thickness of 100 to 200 mm. Hardening at 190° C. for 5 minutes resulted in smooth coats with very good adhesive capacity. The surface of the coating can be embossed in various ways either before or after gelating.

EXAMPLE 3

100 parts by weight of polyolefin polymer a), a PE acrylic acid copolymer are added by dropping and mixed with 100 parts by weight of a vinyl ester of neodecanoic acid in a kneader at a temperature from 125 to 130° C. until a homogeneous glassy melt is reached.

Then the batch is cooled down to 65° C. while the kneading continues. A phase separation occurs when the batch is cooled below the melting temperature of the polyolefin polymer, and the polyolefin polymer precipitates with an extremely small grain size and is dispersed. The product is a fine dispersion of the following composition:

100 parts by weight of polyolefin polymer
<u>100</u> parts by weight of vinyl ester of neodecanoic acid
200

200 parts by weight of the above dispersion are homogeneously intermixed in a kneader at a temperature of approx. 50° C. with a mixture of 11 parts by weight of a vinyl ester of neodecanoic acid, 11 parts by weight of a liquid UP resin, 6 parts by weight 2,3-epoxypropyl methacrylate and 3 parts by weight of a bifunctional methacrylate (polyethyleneglycol-400-dimethacrylate). 1.2 parts by weight of silicic acid and 1.7 parts by weight of tert. butyl perbenzoate are added separately thereafter. The resulting plastisol is composed as follows:
200 parts by weight of the above dispersion
11 parts by weight of vinyl ester of neodecanoic acid
11 parts by weight of liquid UP resin
6 parts by weight of 2,3-epoxypropyl methacrylate
3 parts by weight of polyethyleneglycol-400-dimethacrylate
1.7 parts by weight of tert. butyl perbenzoate
1.2 parts by weight of precipitated silicic acid traces of black The PO plastisol produced in this way has a viscosity of 4.7 Pa*s at 131 1/s.

Film samples were gelated from the PO plastisol at 150° C. over 30 minutes. A tension test of the gelated samples showed a tensile strength of 4.5 MPa and an elongation due to tearing of 80%.

EXAMPLE 4

100 parts by weight of polyolefin polymer a) (ethylene-acrylic acid copolymer) are processed into a granulate with 77 parts by weight of an EP resin (bisphenol-A resin with an epoxide equivalent weight of 875 to 1000 g/eq and a molar weight >700 g/mol) in a synchronous twin-screw extruder at temperatures of 160° C. In a second process step, this granulate is molten at temperatures of 160° C. over a worm length of 8*D at a speed of 75 r.p.m. At a first dosing point (11*D worm length),117 parts by weight of a 2.6:3.3:1 mixture of neodecanoic vinyl ester, polyethyleneglycol-400-dimethacrylate and a liquid UP resin is added at a melt temperature of approx. 123° C.

The result is a dispersion of solid agglomerate crumbs of the following composition:
100 parts by weight of polyolefin polymer a)
77 parts by weight of bisphenol-A resin with an epoxide equivalent weight from 875 to 1000 g/eq and a molar weight >700 g/mol
44 parts by weight of vinyl ester of neodecanoic acid
56 parts by weight of polyethyleneglycol-400-dimethacrylate
17 parts by weight of liquid UP resin
294

294 parts by weight of this dispersion are added by dropping to, and intermixed in a kneader at a temperature of approx. 50 . . . 65° C. with, a mixture of 15 parts by weight of a bifunctional methacrylate (polyethyeneglycol-400-dimethacrylate), 48 parts by weight of a liquid UP resin and 16 parts by weight of 2,3-epoxypropyl methacrylate until a homgeneous glassy melt is reached. Subsequently, methyl hexahydrophthalic anhydride, dibenzoyl peroxide and highly disperse silicic acid are added.

The product is a PO plastisol of the following composition:
294 parts by weight of the above dispersion
48 parts by weight of liquid UP resin
15 parts by weight of polyethyleneglycol-400-dimethacrylate
55 parts by weight of vinyl ester of neodecanoic acid
11 parts by weight of methyl hexahydrophthalic anhydride
13 parts by weight of precipitated silicic acid
13 parts by weight of dibenzoyl peroxide The components were homogeneously intermixed in a mixer until the batch had reached a glassy, paste-like state. The melt temperature should not exceed 70° C.

The PO plastisol thus produced shows thixotropic rheological behavior and has a viscosity of 7.0 Pa*s at 131 1/s.

Film samples were gelated from this PO plastisol at 150° C. over 30 minutes.

A tension test of the gelated samples showed a tensile strength of 7.0 MPa and an elongation due to tearing of 50%.

EXAMPLE 5

100 parts by weight of polyolefin polymer a) (ethylene-acrylic acid copolymer) are molten in a synchronous twin-screw extruder at temperatures from 160 to 170° C. over a worm length of 8*D at a speed of 90 r.p.m. At a first dosing point (11*D worm length), 29 parts by weight of a 1:1 mixture of neodecanoic vinyl ester and diisononyl phthalate are added at a melt temperature of approx. 124° C. Another 24 parts by weight of diisononyl phthalate are worked into the batch at a melt temperature of approx. 94° C. at a second dosing point (18*D worm length). The product is a dispersion in the form of solid agglomerate crumbs and with a primary grain size of approx. 1 mm. The product is of the following composition:
100 parts by weight of polyolefin polymer a)
39 parts by weight of diisononyl phthalate
14 parts by weight of neodecanoic vinyl ester
153

The dispersion produced in this way is further processed in a mixer into a PO plastisol with the following composition:
153 parts by weight of the above PO dispersion
43 parts by weight of finely dispersed silicic acid
16 parts by weight of polyethyleneglycol dimethacrylate with 4-4 ethyleneglycol units
221 parts by weight of neodecanoic vinyl ester
79 parts by weight of liquid EPDM rubber
40 parts by weight of liquid UP resin
22 parts by weight of tert. butyl perbenzoate The components are homogeneously intermixed in a mixer at 60–70° C. until the batch reaches a glassy, paste-like state. The highly dispersed silicic acid is worked into the PO dispersion first. The liquid rubber and UP resin are added together with the neodecanoic vinyl ester. Finally, tert. butyl perbenzoate is added at temperatures T<50° C. The PO plastisol thus produced shows distinct thixotropic rheological behavior and has a viscosity of 8.5 Pa*s at 131 1/s. The PO plastisol was applied to various substrates (steel plate, plate coated by cataphoretic dipping, galvanized plate, aluminum plate, glass) with a thickness of layer ranging from approx. 1.5 to 2 mm. Combined hardening within 25 minutes at 115° C. and within 10 minutes at 150° C. yields smooth elastomeric coatings with excellent adhesive capacity. Film samples were gelated without pressure from the PO plastisol.

A tension test of the gelated samples showed a tensile strength of 5.0 MPa and an elongation due to tearing of 280%.

EXAMPLE 6

A mixture of 100 parts by weight of an LD-PE, 17 parts by weight of an EPDM rubber and 7 parts by weight of a TPE block polymer is used as polyolefin polymer a). The polymer components were molten in a sigma mixer at a temperature of 130° C. and intermixed homogeneously. Subsequently, 12.8 parts by weight of a lauryl acrylate are added by dropping in portions relating to 100 parts by weight of the polyolefin polymer until a homogeneous glassy melt is reached. Then the melt is cooled while mixing continues. 16.4 parts by weight of a 2-hydroxyethyl methacrylate and 2.6 parts by weight of a polyethyleneglycol dimethacrylate are added within the temperature range from 95 . . . 80° C. and worked in homogeneously. Mixing and cooling of the batch continues until a temperature of 50 . . . 60° C. is reached. The product is a soft paste-like melt.

The dispersion is composed as follows:
100 parts by weight of PO polymer
12.8 parts by weight of lauryl acrylate
16.4 parts by weight of 2-hydroxyethyl methacrylate
2.6 parts by weight of polyethyleneglycol dimethacrylate
131.8

The dispersion produced in this way is further processed into a PO plastisol of the following composition:
131.8 parts by weight of PO dispersion
19.0 parts by weight of lauryl acrylate
3.5 parts by weight of chalk
0.75 parts by weight of aerosol
0.65 parts by weight of black
1.4 parts by weight of peroxide (TBPEH)

The PO plastisol thus produced shows thixotropic rheological behavior and has a viscosity of 1.65 Pa*s at 131 1/s.

Film samples (300 mm) were gelated from this PO plastisol without pressure at 190° C. over 5 minutes.

A tension test of the gelated samples showed a tensile strength of 4.5 MPa and an elongation due to tearing of 210%. The PO plastisol was applied to plate coated by cataphoretic dipping at a layer thickness of approx. 1.5 to 2 mm and gelated at 130° C. over 30 minutes to yield smooth coats with excellent adhesive capacity. Furthermore, the PO plastisol was applied to textile and paper substrates at thicknesses from 150 to 250 mm and gelated at 190° C. to smooth and odorless coats with excellent adhesive capacity. Multi-layer textile coatings were also produced using direct and reverse coating processes. These coats were embossable, varnishable and printable and did not show any deformation tendencies.

What is claimed is:

1. A chlorine-free polyolefin-based plastisol or organosol comprising:
    (a) a dispersion medium comprising a liquid compound capable of polyaddition selected from the group consisting of monomers, oligomers and prepolymers;
    b) a polyolefin in dispersed form, which has been precipitated from said dispersion medium by cooling; and
    (c) a polyaddition initiator system;
wherein the difference between the solution parameter of the dispersion medium and the solution parameter of the polyolefin is less than 2.5 $(J/cm^3)^{0.5}$ and wherein the polyolefin is one or more selected from the group consisting of polyethylene, polypropylene, copolymers of ethylene, propylene and optionally $C_3$–$C_8$ α-olefins, and copolymers of ethylene, propylene, and optionally $C_3$–$C_8$ α-olefins with one or more monomers selected from acrylic acid and esters thereof, methacrylic acid and esters thereof, vinyl esters, vinyl ethers, vinyl acetate, vinyl alcohols, methyl or ethyl acrylate itaconic acid and the anhydride and esters thereof, triethoxyvinyl silane, vinyl alcohol, and maleic acid and the anhydride and esters thereof, wherein the maleic acid anhydride and esters are present at from 2 to 15 mole percent of the copolymer and the other monomers are present at from 1 to 50 mole percent of the copolymer.

2. The chlorine-free polyolefin-based plastisol or organosol of claim 1, further comprising inert fillers.

3. The chlorine-free polyolefin-based plastisol or organosol of claim 1 prepared by:
    (i) homogeneously mixing the polyolefin (a), in the form of granulates crumbs and cuttings at a temperature at least 10° C. higher than the melting temperature of the polyolefin (a) with a portion of the dispersion medium (b);
    (ii) cooling the mixture with mixing to a temperature 5 to 20° C. below the melting temperature of the polyolefin to produce a fine-particle dispersion of the polyolefin having a primary grain size below 10 μm;
    (iii) mixing, at a temperature of less than 60° C., the remaining portion of the dispersion medium (b) and the initiator system (c) with the mixture from (ii); and
    (iv) processing the mixture from (iii) into a plastisol or organosol having thixotropic rheological properties.

4. The chlorine-free polyolefin-based plastisol or organosol of claim 1 further comprising inert fillers.

5. The chlorine-free polyolefin-based plastisol or organosol of claim 1, wherein the polyolefin is selected from the group consisting of low density polyethylene, medium density polyethylene, polypropylene, copolymers of ethylene with one or more monomers selected from the group consisting of vinyl acetate, vinyl alcohol, maleic anhydride, methyl acrylate and ethyl acrylate, copolymers of propylene with one or more monomers selected from the group consisting of vinyl acetate, vinyl alcohol, maleic anhydride, methyl acrylate and ethyl acrylate wherein the maleic anhydride and esters are present at from 2 to 15 mole percent of the copolymer and the other monomers are present at from 1 to 50 mole percent of the copolymer.

6. The chlorine-free polyolefin-based plastisol or organosol of claim 1, wherein the polyolefin comprises one or more groups selected from the group consisting of polar groups and reactive groups.

7. The chlorine-free polyolefin-based plastisol or organosol of claim 6, wherein the one or more groups are selected from the group consisting of groups containing acid functional groups and groups containing ester groups.

8. The chlorine-free polyolefin-based plastisol or organosol of claim 1, wherein the polyolefin in (a) is homogeneously intermixed with up to 80 percent by weight of a material selected from the group consisting of rubbers that are at least partially compatible with the polyolefin and thermoplastic elastomers that are at least partially compatible with the polyolefin.

9. The chlorine-free polyolefin-based plastisol or organosol of claim 8, wherein the thermoplastic elastomer is a block copolymer.

10. The chlorine-free polyolefin-based plastisol or organosol of claim 1, wherein one or more of the monomers, oligomers and prepolymers in the dispersion medium (b) comprise one or more materials selected from the group consisting of epoxide containing compounds, allyl (meth) acrylates, unsaturated polyesters, vinyl esters and polyester acrylate resins.

11. The chlorine-free polyolefin-based plastisol or organosol of claim 1, wherein the dispersion medium (b) further comprises a liquid softener.

12. The chlorine-free polyolefin-based plastisol or organosol of claim 1, wherein the initiator system (c) comprises one or more selected from the group consisting of catalytic Lewis acid polymerization initiators, latent carboxylic acid salts, tertiary amines and cationic photoinitiators.

13. The chlorine-free polyolefin-based plastisol or organosol of claim 1, wherein one or more of the monomers, oligomers and prepolymers in the dispersion medium (b) comprise one or more radically polymerizable materials selected from the group consisting of allyl compounds, vinyl compounds, unsaturated polyesters, vinyl esters and polyester acrylate resins.

14. The chlorine-free polyolefin-based plastisol or organosol of claim 1, wherein the polyolefin in (a) is present at 100 parts by weight and the dispersion medium (b) is present at from 60 to 800 parts by weight based on 100 parts by weight of the polyolefin.

15. The chlorine-free polyolefin-based plastisol or organosol of claim 1, wherein the initiator system (c) comprises one or more selected from the group consisting of unsaturated acid anhydrides, organic peroxides and free radical photoinitiators.

16. A method for producing a chlorine-free polyolefin-based plastisol or organosol comprising:

(i) providing a polyolefin and a dispersion medium;

(ii) homogeneously mixing the polyolefin at a temperature at least 10° C. higher than the melting temperature of the polyolefin with a portion of the dispersion medium so that the polyolefin dissolves in said dispersion medium;

(iii) cooling the mixture with mixing to a temperature 5 to 20° C. below the melting temperature of the polyolefin to produce a fine-particle dispersion of the polyolefin having a primary grain size below 10 µm;

(iv) mixing, at a temperature of less than 60° C., the remaining portion of the dispersion medium and an initiator system; and (v) processing the mixture from (iv) into a plastisol or organosol having thixotropic rheological properties.

17. The chlorine-free polyolefin-based plastisol or organosol of claim 1 further comprising inert filters.

18. The method of claim 16, wherein the polyolefin in (a) is homogeneously intermixed with up to 80 percent by weight of a material selected from the group consisting of rubbers that are at least partially compatible with the polyolefin and thermoplastic elastomers that are at least partially compatible with the polyolefin.

19. The method of claim 16, wherein one or more of the monomers, oligomers and prepolymers in the dispersion medium (b) comprise one or more materials selected from the group consisting of epoxide containing compounds, allyl (meth)acrylates, unsaturated polyesters, vinyl esters, polyester acrylate resins, allyl compounds, vinyl compounds, unsaturated polyesters and polyester acrylate resins.

20. The method of claim 16, wherein the dispersion medium (b) further comprises a liquid softener.

21. The method of claim 16, wherein the initiator system (c) comprises one or more selected from the group consisting of catalytic Lewis acid polymerization initiators, latent carboxylic acid salts, tertiary amines, cationic photoinitiators, unsaturated acid anhydrides, organic peroxides and free radical photoinitiators.

22. The method of claim 16, wherein the difference between the solution parameter of the dispersion medium and the solution parameter of the polyolefin is less than 2.5 $(J/cm^3)^{0.5}$.

23. The method of claim 16, wherein the polyolefin is present at 100 parts by weight and the dispersion medium is present at from 60 to 800 parts by weight based on 100 parts by weight of the polyolefin.

* * * * *